Jan. 11, 1938.   F. R. NEELY   2,105,359
COMPOSITE BOX AND MANUFACTURE THEREOF
Filed Aug. 15, 1931   16 Sheets-Sheet 1
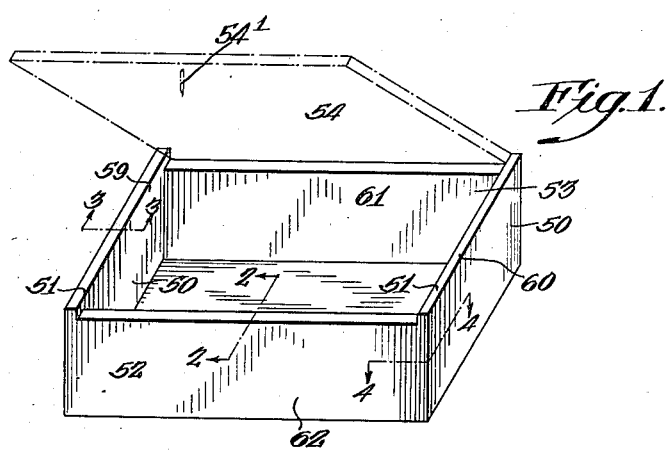
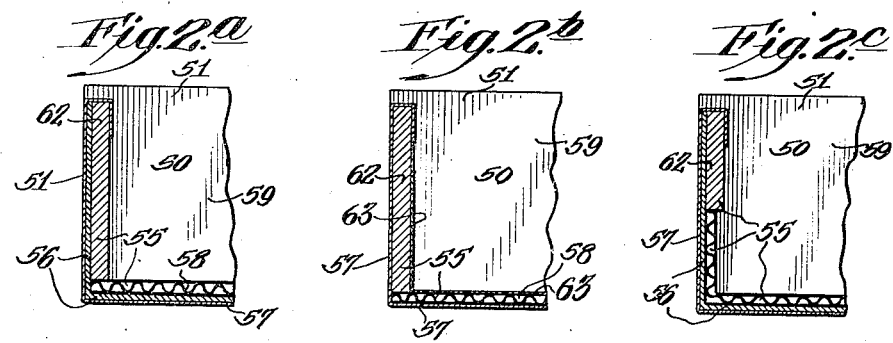
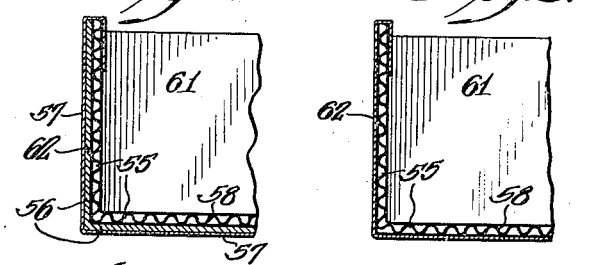
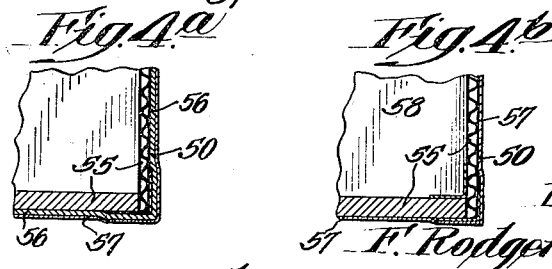
Inventor
F. Rodgers Neely Jan. 11, 1938.  F. R. NEELY  2,105,359
COMPOSITE BOX AND MANUFACTURE THEREOF
Filed Aug. 15, 1931  16 Sheets-Sheet 2
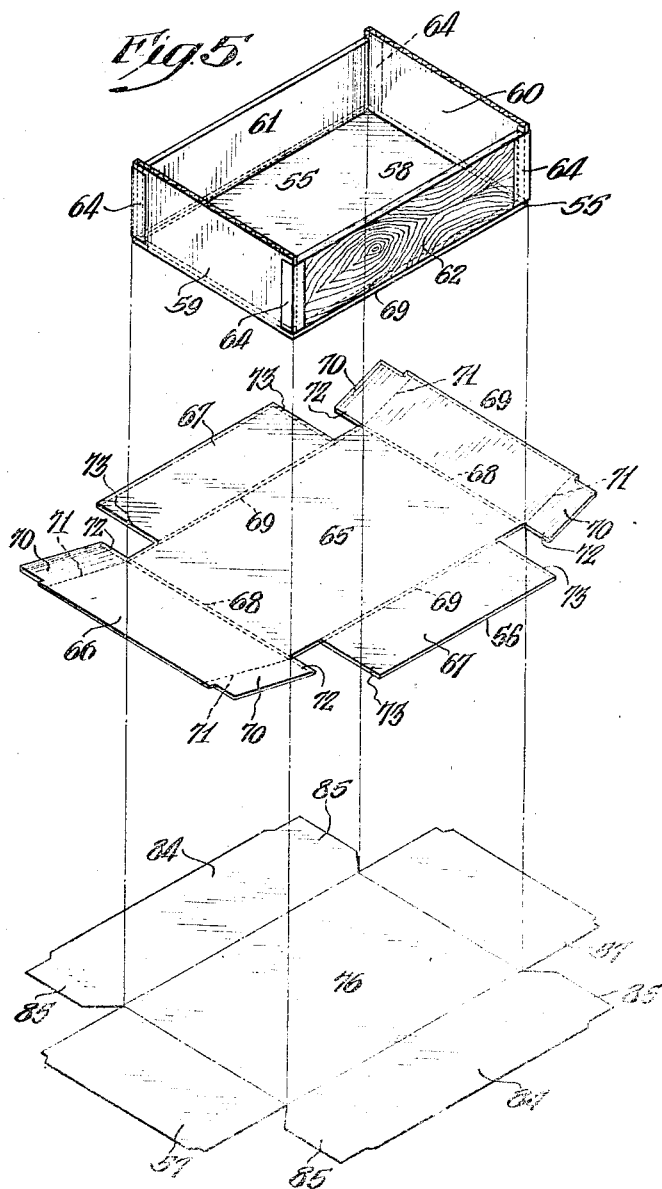

Fig. 6

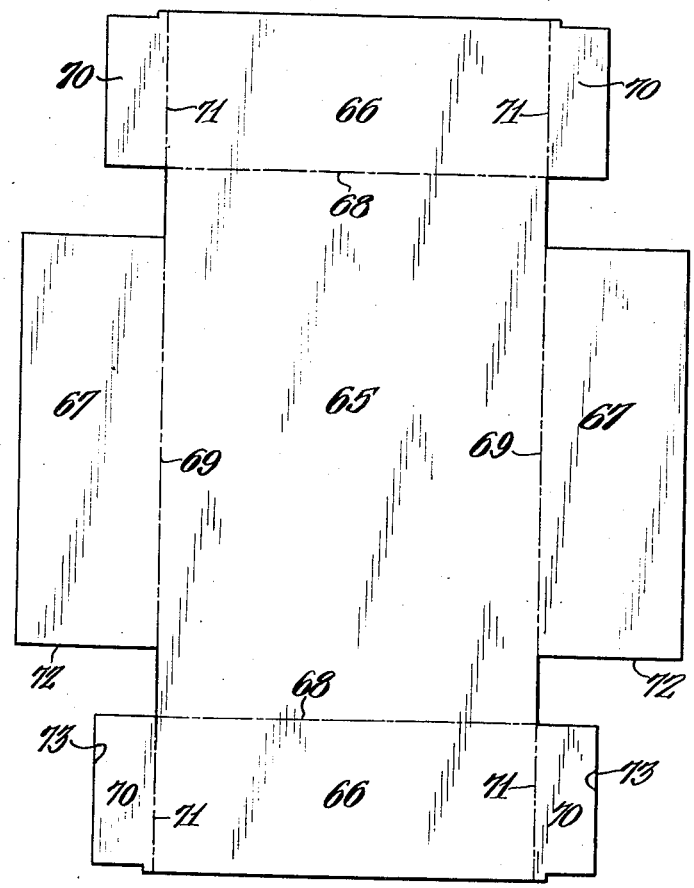

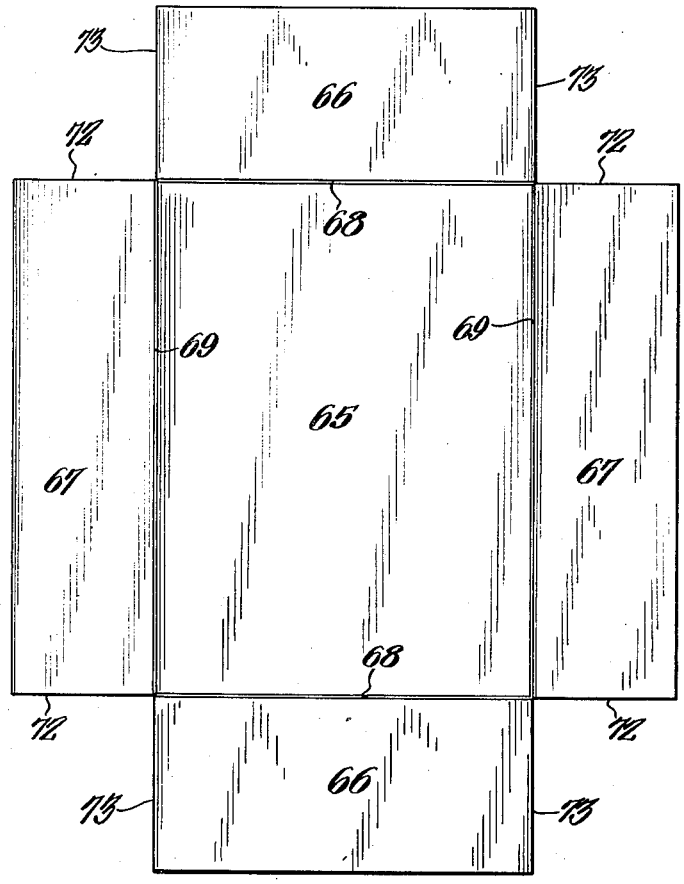

Jan. 11, 1938.   F. R. NEELY   2,105,359
COMPOSITE BOX AND MANUFACTURE THEREOF
Filed Aug. 15, 1931   16 Sheets-Sheet 6

Jan. 11, 1938.                F. R. NEELY                2,105,359
              COMPOSITE BOX AND MANUFACTURE THEREOF
                     Filed Aug. 15, 1931        16 Sheets-Sheet 7
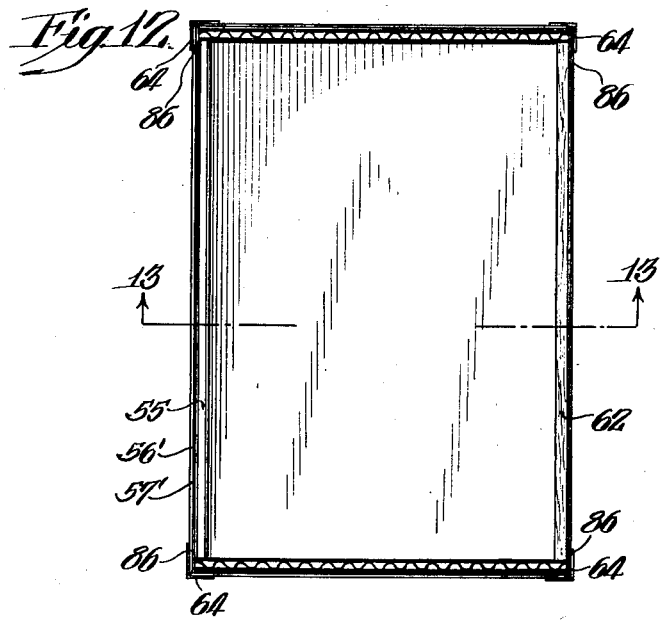
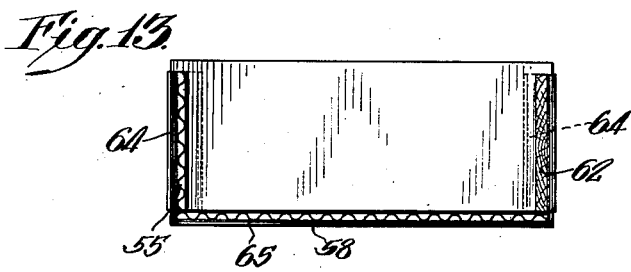

Jan. 11, 1938.      F. R. NEELY      2,105,359
COMPOSITE BOX AND MANUFACTURE THEREOF
Filed Aug. 15, 1931      16 Sheets-Sheet 8
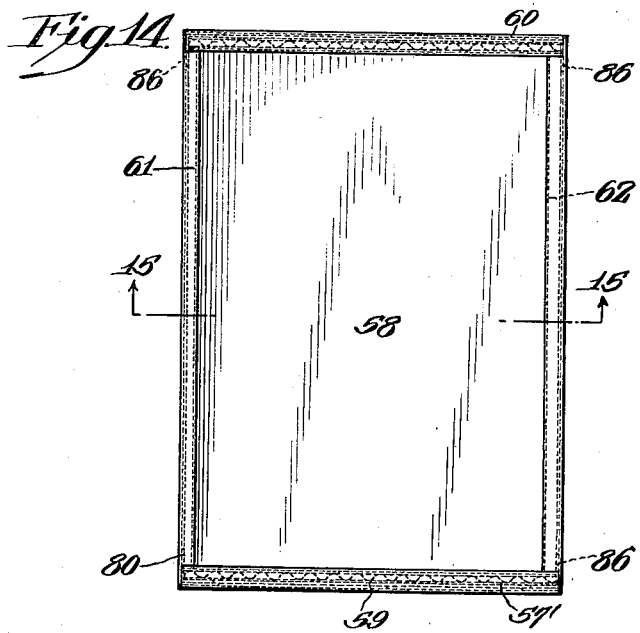
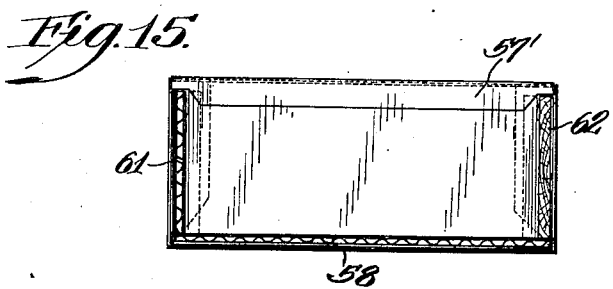

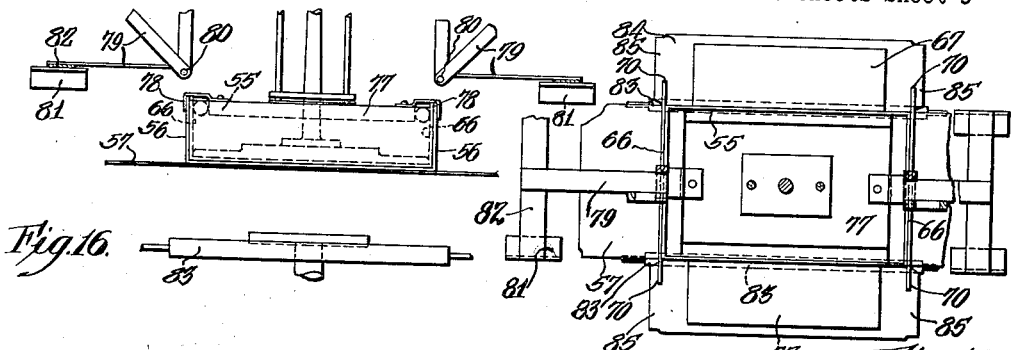

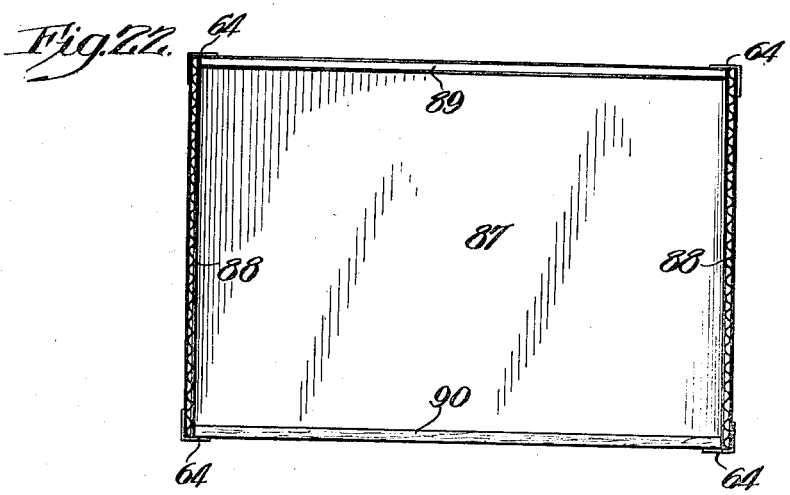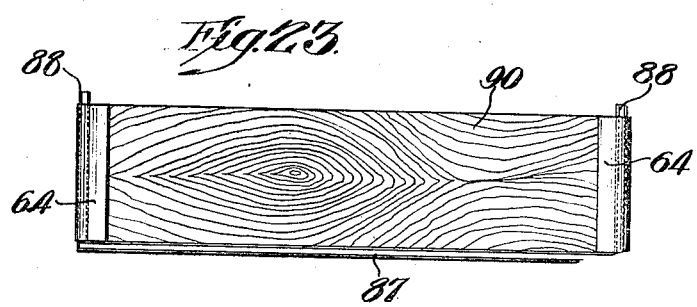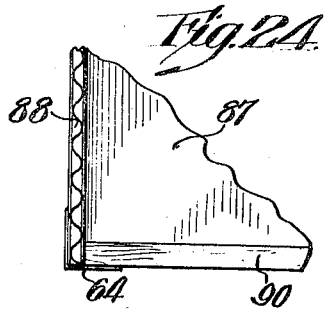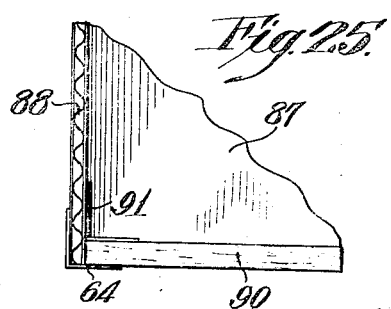

Jan. 11, 1938.   F. R. NEELY   2,105,359
COMPOSITE BOX AND MANUFACTURE THEREOF
Filed Aug. 15, 1931   16 Sheets-Sheet 11

Witnesses:

Inventor
F. Rodgers Neely.
by
Attorneys.

Jan. 11, 1938.  F. R. NEELY  2,105,359
COMPOSITE BOX AND MANUFACTURE THEREOF
Filed Aug. 15, 1931   16 Sheets-Sheet 12
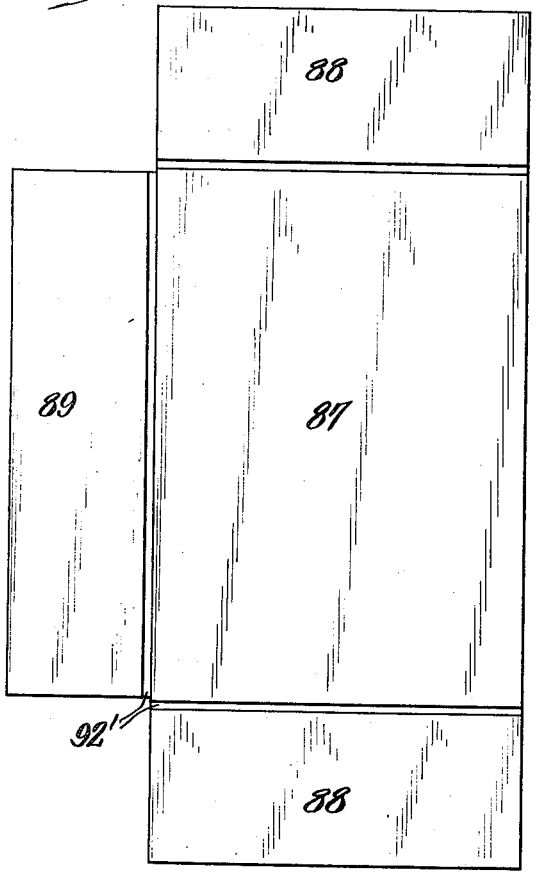
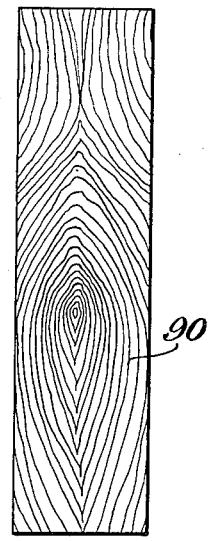
Witnesses:
Inventor
F. Rodgers Neely.
by
Attorney Jan. 11, 1938.    F. R. NEELY    2,105,359
COMPOSITE BOX AND MANUFACTURE THEREOF
Filed Aug. 15, 1931    16 Sheets-Sheet 13
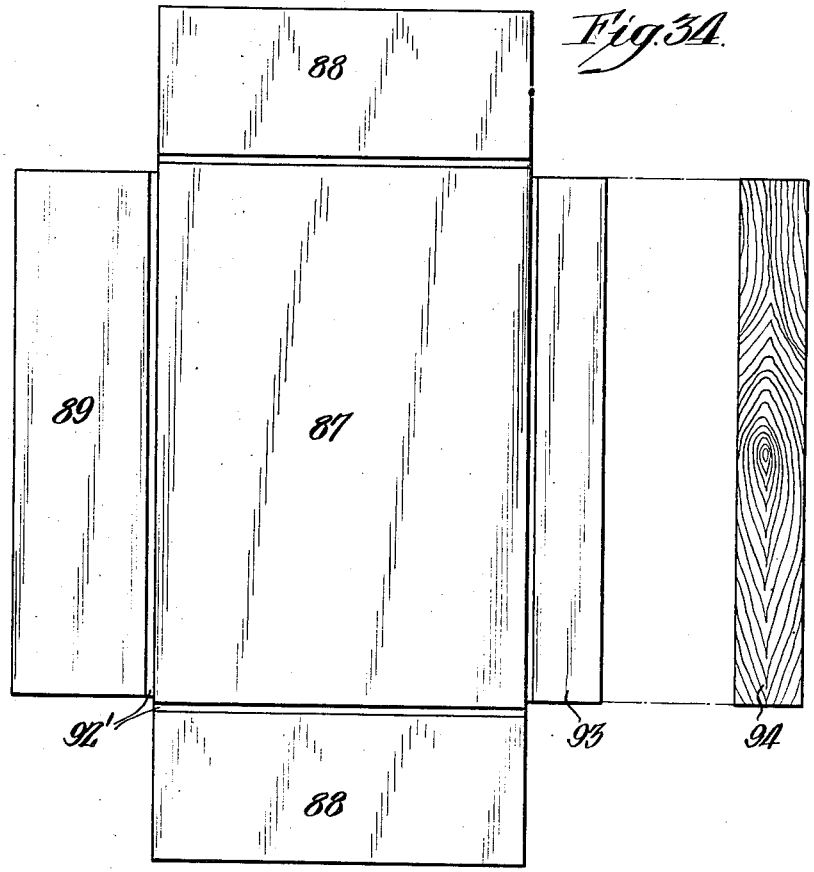
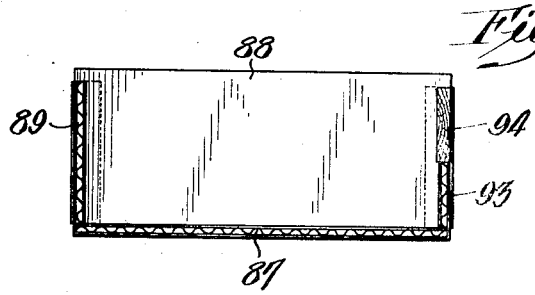

Jan. 11, 1938. F. R. NEELY 2,105,359
COMPOSITE BOX AND MANUFACTURE THEREOF
Filed Aug. 15, 1931 16 Sheets-Sheet 14
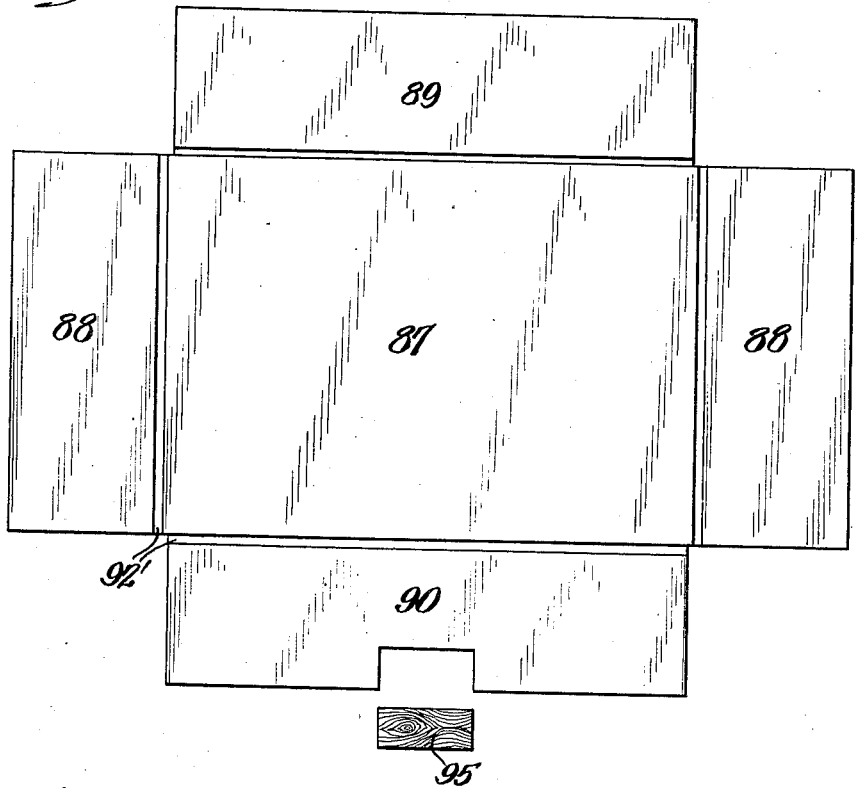
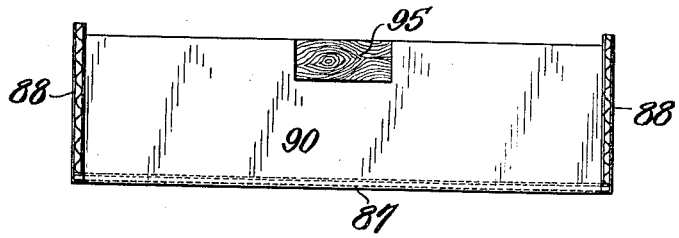

Jan. 11, 1938.  F. R. NEELY  2,105,359
COMPOSITE BOX AND MANUFACTURE THEREOF
Filed Aug. 15, 1931  16 Sheets-Sheet 15
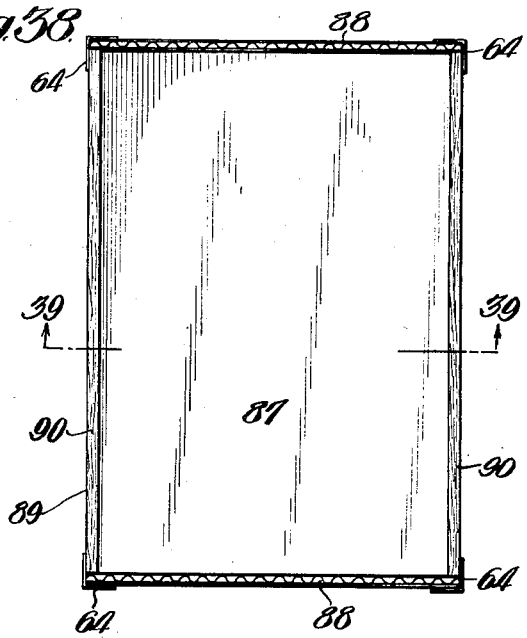
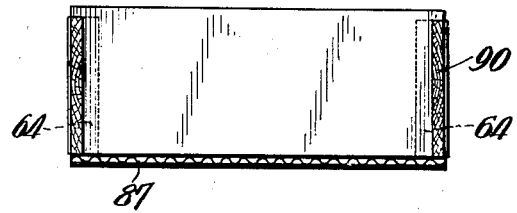
Witnesses:
Inventor
F. Rodgers Neely
by
Attorneys.

Jan. 11, 1938. F. R. NEELY 2,105,359
COMPOSITE BOX AND MANUFACTURE THEREOF
Filed Aug. 15, 1931 16 Sheets—Sheet 16
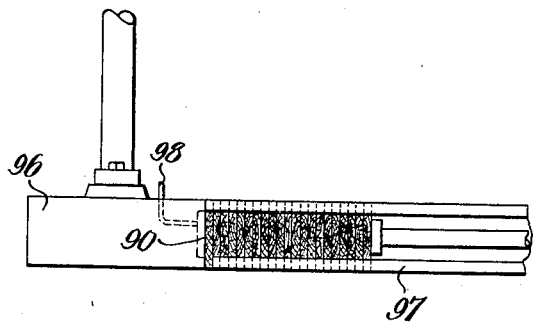
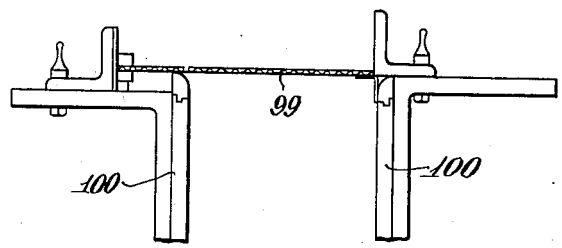
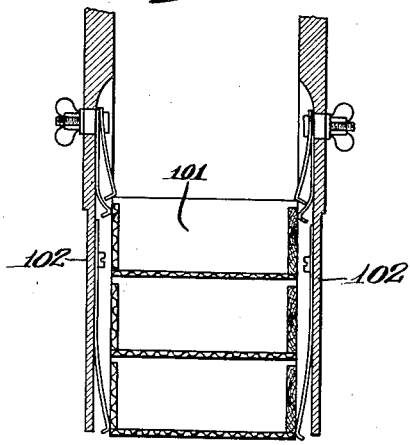
Witnesses
Inventor
F. Rodgers Neely
by Attorneys Patented Jan. 11, 1938

2,105,359

UNITED STATES PATENT OFFICE 2,105,359

COMPOSITE BOX AND MANUFACTURE THEREOF

Frank Rodgers Neely, Allentown, Pa., assignor to A. H. Balliet Corporation, Allentown, Pa., a corporation of Pennsylvania Application August 15, 1931, Serial No. 557,340

4 Claims. (Cl. 93—43)

My invention relates to composite boxes and to the manufacture thereof.

A purpose of my invention is to cheapen and lessen the weight of boxes of a type hitherto usually made of wood and in which the lids can be nailed down.

A further purpose is to make the ends and bottom and permissibly the back of a box of corrugated paper or the like and part or all of the front of the box and the back, if desired, of wood composition or the like.

A further purpose is to provide a box for easy manufacture on suitably modified existing machines and that will have the appearance and other desired characteristics of wooden boxes but be much lighter and cheaper than wooden boxes.

A further purpose is to make a composite box with inner and outer shells and both shells having ends higher than the sides.

A further purpose is to use extensions from the end flap of a blank for an outer shell as stays to hold together the set-up ends and sides of the shell.

A further purpose is to cover the ends of drop lid ends of an inner shell with side turn-in portions of the end flaps of an outer shell.

A further purpose is to use a wrapping machine to apply simultaneously an outer to an inner shell and an outside wrap to the outer shell.

A further purpose is to provide novel and desirable blanks for the manufacture of inner and outer shells of a composite box on a box machine.

A further purpose is to provide a desirable method of manufacturing an inner box using a suitably modified existing machine.

A further purpose is to provide a desirable method of assembling inner and outer shells and an external wrap.

Further purposes will appear in the specification and in the claims.

I have elected to show a few only of the many forms of my invention, selecting forms that are practical and efficient in operation and which well illustrate the principles involved.

Figure 1 is a perspective view showing finished box structure embodying my invention, the view being intended to represent equally well different alternative boxes of the invention variant with respect to detail construction.

Figures 2a, 2b, and 2c are fragmentary detail sections taken in positions corresponding to that of line 2—2 of Figure 1 and showing alternative constructions.

Figures 3a and 3b are fragmentary detail sections taken in positions corresponding to that of line 3—3 of Figure 1 with the alternative constructions respectively of Figures 2a and 2b.

Figures 4a and 4b are fragmentary horizontal sections taken in positions corresponding to that of line 4—4 of Figure 1 with the alternative constructions respectively of Figures 2a and 2b.

Figure 5 is a perspective view comparing desirable forms of inner and outer shells and wrap of the box of Figures 1, 2a, 3a, and 4a, preparatory to assembly for feeding to a box machine and in position for assembly.

Figure 6 is a view generally similar to Figure 5 but different with respect to detail members,—the outer shell and wrap.

Figure 7 is a plan view of a desirable form of blank for the outer shell member of Figure 5.

Figure 8 is a view corresponding generally with that of Figure 7 of a desirable form of the blank for the outer shell of Figure 6.

Figure 9 is an end elevation of Figure 8.

Figure 12 is a top plan view corresponding generally to Figure 10 but showing the inner shell assembled with an outer shell of the form of Figures 6 and 8.

Figure 13 is a vertical section upon the line 13—13 of Figure 12.

Figure 14 shows an inner box wrapped without an intermediate outer shell, the view being a top plan.

Figure 15 is a vertical section taken upon the line 15—15 of Figure 14.

Figures 16 to 18 inclusive are front elevations and Figs. 19 to 21 inclusive the corresponding plan views, all somewhat diagrammatic, illustrating successive early phases of the assembly of the inner shell with the outer shell and wrap using a type of wrapping machine disclosed in Kleinsmith et al., U. S. Patent No. 1,733,229, with the machine somewhat modified to adapt it to the present method of manufacture, the form of outer shell being that illustrated in Figures 5 and 7.

Figure 22 is a top plan view of one form of inner box.

Figure 23 is a front elevation of Figure 22.

Figure 24 is an enlarged fragment of Figure 22.

Figure 25 is a view corresponding to Figure 24 modified with respect to a minor detail.

Figure 26:
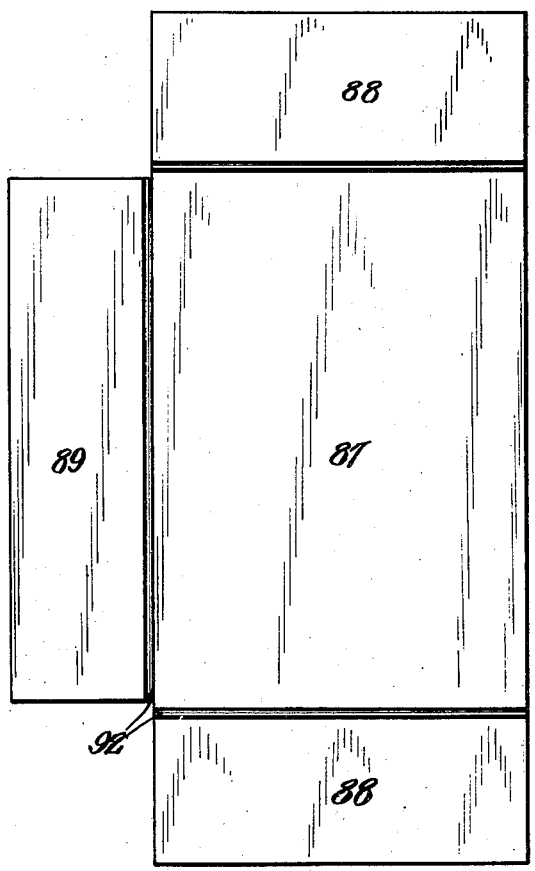

Figure 26 is a top plan view of one form of blank for the bottom, ends and back of the inner box.

Figure 27:
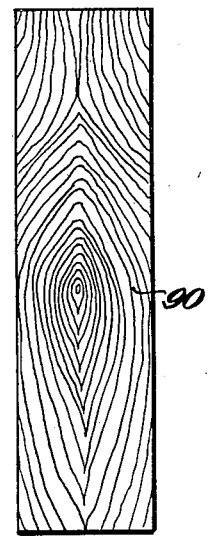

Figure 27 is a plan view of a detail assembled with the blank of Figure 26.

Figure 28:
Figure 29:

Figures 28 and 29 are end elevations of Figures 26 and 27, respectively.

Figures 30 to 33 are views corresponding respectively to Figures 26 to 29 but showing the blank for bottom, ends and back in a slightly different form.

Figure 34 is a plan view of a somewhat different form of inner box blank including separated portions for assembly in the box machine.

Figure 35 is a vertical section through the folded inner box made from the blank of Figure 34.

Figure 36 is a view corresponding generally to Figure 34 but showing a different form.

Figure 37 is a front elevation of the set-up box made from the form of Figure 36.

Figure 38 is a top plan view of an inner box, the view corresponding generally to Figure 22 but showing a somewhat different form.

Figure 39 is a vertical section taken upon the line 39—39 of Figure 38.

Figure 40 is a fragmentary view corresponding to a modified portion of Figure 2 of U. S. Patent 1,383,697 to C. C. Davis, showing blanks for an inner box in a box machine preparatory to assembly.

Figure 41 is a fragmentary section corresponding generally to Figure 3 of the above patent, showing a number of set-up boxes, with the bottom box ready for downward discharge.

Like numerals refer to like parts in all figures.

Describing in illustration and not in limitation and referring to the drawings:—

The present invention is directed to what might be called a substitute box in that it comprises a wrapped box of a type that has heretofore been usually made of wood or the like, optionally looking like the wooden boxes of the prior art, having drop lid ends and a front adapted to hold one or more nails from the lid so that the box lid may be nailed down; also permissibly a back of different materials from the bottom and ends. The front and back may be made of wood or composition of which one example is found in chestnut board.

Heretofore substitute boxes have been without provisions for permitting an effective nailing down of the lids and in many cases, particularly when the boxes were intended to be used for cigars, this has been a feature so disadvantageous as to prevent the boxes from being used for the intended purpose.

One of the wide applications for boxes of the present invention is thought to be for cigars or the like, with the boxes adapted to be closed, sealed and fastened shut by an inspector driving one or more nails at the forward edge of the lid downward into the front of the box.

Figure 1 shows a typical finished box of the present invention that is intended to have the outside appearance of a box of the prior art, for example that of a wooden cigar box.

The ends 50 are higher at 51 than the front and back sides 52 and 53 and the lid 54, shown in dot-and-dash, fits between the drop lid ends 51.

The box may comprise form A including inner and outer shells 55 and 56 and an outside wrap 57, as illustrated in Figures 2a, 3a, and 4a, or form B including an inner shell 55 and outer wrap 57 omitting the outer shell 56, as in Figures 2b, 3b and 4b, or form C which is form A modified with respect to a detail that is illustrated in alternative forms in Figures 2a and 2c.

In both the A and B forms the inner shell comprises a bottom 58, ends 59 and 60 and permissibly a back 61 that are of corrugated board or the like, preferably integral portions of a single piece, and a front 62 adapted to receive and hold a nail 54' from the outer edge of the lid 54, and the box covered by the wrap 57 will usually receive an inner lining of which a fragment as shown at 63 in Figure 2b, such for example as now applied to cigar boxes of the prior art but which I have not considered it necessary to show in more than this one figure.

Desirably the inner and outer shells are in registry or even with one another along their corresponding upper edges, each shell including drop lid ends at 51 suitably higher than the top edges of the long sides at front and back.

The inner shell, exclusive of any stays, thus desirably includes larger and smaller board portions of which the larger preferably comprises an inexpensive open texture composition board and the smaller one or more boards, one of sufficiently dense texture to adapt the upwardly presented edges to receive and hold one or more nails from the lid, and permissibly one capable of holding the lid.

The larger open texture board may usually include the bottom and ends of the inner shell, usually also, but not necessarily, the back of the shell and optionally also the shell front except at any part or parts thereof needing to receive and hold a nail or nails from the lid.

The smaller denser texture board includes an upwardly directed edge portion presented to the lid for nailing at any desired point or points thereof.

With boxes having a hinged lid the denser board may include the whole or a portion only of the shell front (Figures 2a, 22, 2c, 34, 35 and 37), or if preferred, the denser portion may also include the whole or a suitable portion of the shell back (Figures 38 and 39).

While an important feature of the invention is directed to means permitting an effective nailing down of the lid, it will be understood that other features of the invention are independent of whether or not the lid is to be fastened down by one or more nails and, if there is to be no nailing, the open structure board may include both the front and the back as well as the ends and bottom of the shell.

The open board comprising the larger portion of the inner shell is suitably corrugated board, which may be made wholly or partially of chip board, kraft liners, straw board, chestnut board or other pulp board, paper or composition, herein called conventionally corrugated board and the portion presented to the nail or nails of the lid or which holds the back may be suitably wood or any composition board material, artificial or natural, adapted to receive and hold nails, such material being herein called conventionally dense board.

It will be understood that while the lids of cigar boxes and the like adapted to be replaced by the substitute boxes of the present invention are in usual present practice wood, they may be of any suitable board, with or without wrapping.

Usually the inner box is made of board relatively thick as compared to the outer shell, the thinness of the outer shell insuring cleaner-cut outside corners along scored lines of the outer shell blank.

The outer shell is suitably made of chestnut board, kraft liners or jute liners, kraft liners being particularly suitable.

The composite box may be lined before or after assembly. While illustrated as for lining subsequent to assembly in any suitable or usual way, it will be understood the lining may be applied to the inside parts of the inner box blank preparatory to setting it up into a box, the dense board front being separately lined.

The assembly of the inner box with the outer shell and wrap to provide a composite box of the form A, Figures 1, 2a, 3a, and 4a, is illustrated for one form of outer shell in Figure 5 and also in Figures 16 to 21 and for another form of outer shell in Figure 6.

While in Figures 5 and 6 the inner box 55 is illustrated as externally stayed at the corners at 64 it should be understood that the showing of the inner box in these figures is intended for a conventional showing of any suitably set-up inner shell.

The blank 56 for the outer shell of Figure 5 and of Figures 16 to 21 is of novel cruciform, as best seen in Figure 7.

It includes a body 65 that makes the bottom of the outer shell, end flaps 66 and front and back flaps 67, with score lines 68 and 69 between the body and the end and side flaps respectively.

The end flaps 66 make the ends of the outer shell and also short portions of the adjacent sides, having side turn-in extensions 70 from score lines 71, and the long side flaps 67 may be preferably cut away at the ends to clear in set-up positions the turn-in extensions 70 of the end flaps.

The side turn-in extensions 70 of the end flaps when set up function as stays and also as effective covers over the ends of the drop lid end portions of the inner box.

The side flaps 67 when set up preferably substantially fill the portion of the sides not covered by the side turn-in extensions 70 of the end flaps 66, with edges 72 and 73 respectively of the side flaps and end flaps relatively substantially perpendicular whatever the selected angles of these edges with the long side score line 69.

Referring to Figure 5, a wrap 57, outer shell blank 56 and set-up inner shell 55 are illustrated as having been delivered one above another for easy registered assembly.

The wrap 57 may comprise any appropriate wrap of the prior art and may be delivered, glue-side up, from any glue machine.

The outer box blank 56 registered vertically above the wrap may be received from a stencil gluer, with the upper side stencil glued as along the edges and at intermediate strips.

The inner shell 55 comprises any type of box, preferably having a front 62 adapted to receive one or more nails from the lid and the remainder of the box is made of any inexpensive board, which may be corrugated board. They are delivered set-up exteriorly unglued and registered above the outer box blank 56.

The portions 76, 65 and 58 respectively of the wrap 57, blank 56 and inner box 55 that are to form the bottom of the composite box are registered together.

The bottom portion 65 of the open blank 56 of the outer shell may be registered upon the glued surface 76 of the wrap, and the inner box 55 is then registered upon the stencil-glued upper surface of the blank 56.

The inner box 55 carrying the blank 56 for the outer shell upon its bottom and the wrap 57 upon the bottom of the blank 56 may then be assembled into the finished box, either by hand operation, or better, by the use of any one of a number of different wrapping machines of the prior art, modified as to minor details.

One such machine has been disclosed and claimed in U. S. Patent No. 1,733,229 to Kleinsmith et al. In order that the assemblage of the parts may be understood, I have illustrated parts of the assemblage with reference to a machine of this general character in Figures 16 to 21.

The inner box 55 and the adhering blank 56 and wrap 57 are pushed upwardy to place upon a form 77 of a wrapping machine, the form 77 being, for example, the split form of the Kleinsmith patent provided with end clips 78 also of the prior art.

The end flaps 66 of the outer shell are clipped at 78 in set-up positions against the ends of the inner shell. The assembled members may be placed upon the form 77 while the form is in its normal raised position, that at which the form would receive a box for wrapping in the usual way.

When the end flaps of the outer shell include the side turn-in extensions 70, structure should be added to the wrapping machine for automatically turning these extensions on to the sides of the inner shell preparatory to the setting up of the long side flaps 67.

As illustrated, rocker members 79 having stationary horizontal pivots 80 are angularly positioned by the mechanism of the box machine to effect the turning of the extensions 70.

The levers 79 are maintained raised as in Figures 16 and 19 during the application of the assembled inner and outer shells and wrap to the form 77 at which time the inner shell already set up is fitted upwardly on the form and the end flaps 66 of the outer shell set up against the ends of the inner shell are inserted under the clip members 78 of the form.

After applying the assembled shells and wrap to the form, the first operation of the machine may include a concurrent downward movement of the form and an angular downward turning of the members 79 about their pivots 80. Spring ears or plates 81 at the ends of cross portions 82 of the levers 79 sweep in the end extensions 70 upon the long sides of the inner shell. The levers 79 then come to rest, as at the position of Figures 17 and 20, with the spring ears 81 holding the extensions 70 in their set-up positions, preferably before and during an early portion of the upward turning of the long side flaps 67.

The form 77 moves downwardly from the position of Figures 17 and 20 between the usual long side turn-up rolls 83, coming to rest after having moved downwardly somewhat beyond the position indicated in Figures 18 and 21.

During this downward movement of the form the long side flaps 84 of the wrap and corresponding flaps 67 of the outer shell are swept up simultaneously, the turned-over extensions 70 of the outer shell receiving the registering portions of the outer wrap as it travels downwardly from the holding turn-in ears 81.

When the form comes to rest the long side flaps project beyond the top and ends of inner and outer shells, as in the usual wrapping of a box.

The turn-in arms 79 may retract in any way to their horizontal positions of Figures 16 and 19 as soon as they have released the turn-in extensions 70 by reason of the downward travel of the form.

The next operation, the turning in of the end turn-ins 85 of the long side flap of the wrap, and the succeeding operations may be optionally as described in the Kleinsmith patent and are therefore not described here.

It will be seen that the only substantial change in the mechanism of the prior art includes mechanism for turning in the side turn-in flaps 70 of the end flaps of the outer shell.

The new mechanism functions before the usual folding mechanism of the box machine, all of which may optionally be that of any box machine, the usual mechanism thus simultaneously setting up the flaps of the outer shell and of the wrap.

While it is desirable to apply the wrap and outer shell simultaneously to the box this is not essential and the inner shell and outer shell may be combined without an outer wrap. This is sometimes worthwhile in that the different box manufacturers do not all use the same wraps.

The inner shell may also be wrapped without the outer shell, as shown in Figures 14 and 15.

Figure 10:
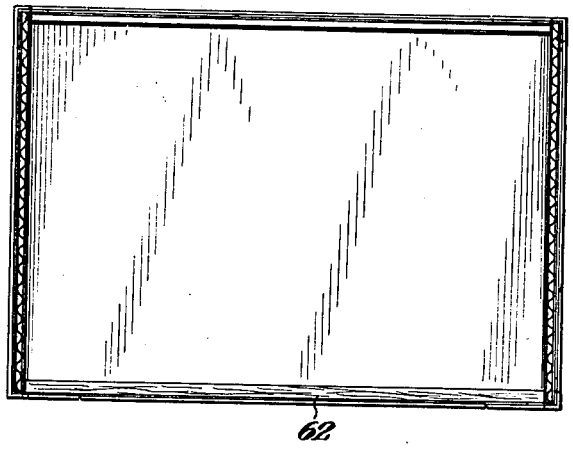
Figure 10 is a plan view showing an inner shell assembled with an outer shell of the form of Figures 7 and 5, the view not including the outside wrap, usually applied to the structure of Figure 10.
Figure 11:
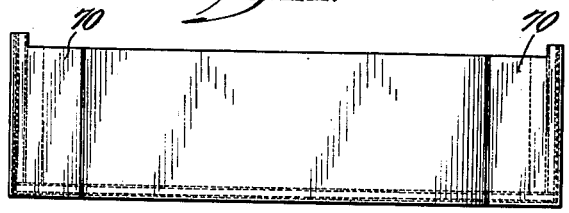
Figure 11 is a front elevation of Figure 10.

Figures 10 and 11 illustrate this type of box. It will be seen, Figure 11, that the side turn-in extensions 70 from the end flaps of the outer shell very effectively cover the end portions of the drop lid ends of the inner shell and also serve as stays for holding the outer shell to the inner shell.

Figure 6:
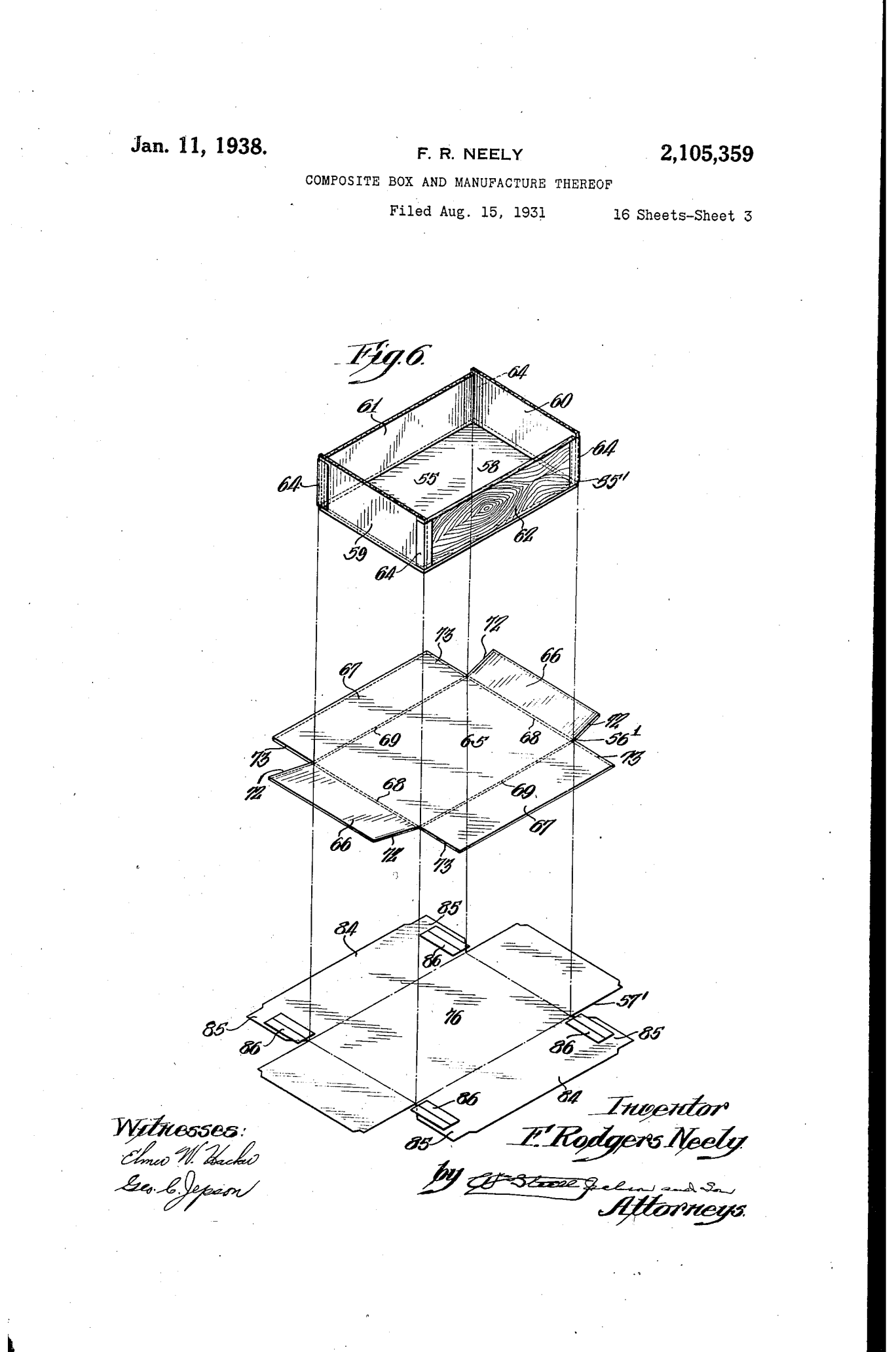

Figure 6 shows the assembly when the outer shell is set up from a conventional cruciform blank.

In this event the cruciform wrap is preferably provided with upwardly glued corner stays at 86 as by mechanism of the prior art, for example by means of a Stokes & Smith gluing machine with a tabbing attachment which fits the four corner stays on to the wrap in glued condition. Such a machine is described in Letters Patent No. 1,806,181, issued to E. G. Rider.

As before the top of the wrap is glued. The cruciform blank 56' for the outer shell, stencil glued on its upper side, is registered upon the wrap 57' and the unglued inner shell 55' is registered on top of the outer shell 56'.

It will be understood that the cruciform outer box, in flat condition, may be stencil glued on its upper side in an ordinary stencil gluing machine, after which it may be spotted or registered on the upper glued face of the wrap and on top of the stays 86 which may suitably comprise kraft paper tape of the prior art. The inner box is next placed upon the flat stencil-glued outer box wrap and the three assembled members applied to the form of a wrapping machine which may include the clip mechanism for holding the end flaps to position but obviously need not include the side turn-in mechanism already described. The finished box is of the form shown in Figure 2a already described as is also the form having side turn-in flaps across the ends of turn-in ends of the inner box.

As before the outer box may be applied to the inner box without the wrap as illustrated in Figures 12 and 13.

It will be seen that the stays 86 at the corners, unnecessary in the form shown in Figures 10 and 11, make the composite box sufficiently rigid for the intended purpose, particularly after wrapping, which latter may be accomplished exactly as in the wrapping of an ordinary box of the prior art.

The inner box may be wrapped without the application of the outer shell, the desirability of the outer shell depending, to considerable extent, upon the intended use of the box and also upon the construction of the inner box.

When the outer shell is to be omitted it will usually be best to strengthen the connection between the front portion of the inner box and the board portion unless the duty is to be quite light.

Figures 22 and 23 show an inner box set up from a blank shown in Figure 26 and whose front is shown in Figure 27. The flat box blank includes a bottom 87, the ends 88 and the back 89, the front 90 being adapted to seat upon the bottom between the ends 88 when these are turned up.

Normally the end flaps 88 are stayed on the outside to the sides by suitable kraft tape or the like as indicated at 64.

If the inner box is to receive an outer shell, the stay fastening between the bottom 87 of the box and front 90 may be omitted in that the outer shell will maintain the parts in their proper relative positions. Optionally however the bottom may be fastened to the front as by nailing or by staying.

Usually inner staying is not necessary, the corner staying being as illustrated at 64, Figure 24.

Where a particularly strong construction is desired, an inner stay may be added as indicated at 91, Figure 25.

The score lines where the flaps turn up in the corners may be crushed, as indicated in Figures 26 and 28 at 92 or skived as indicated at 92', Figures 30 and 32.

While it is usually more desirable to make the front or back as a single unit adapted to take nails or to hold the lid at any point along its length, it will be understood that surface may be provided merely at the point or points that are to receive the nail or nails.

In Figures 34 and 35 a portion 93 of the front flap is made integral with the bottom of the box and therefore with the ends and back. A relatively narrow strip of dense board, suitably wood, is provided at 94 above the lower portion of the front.

In Figures 34 and 35 the wooden strip extends the length of the front. As in many cases the front has to hold but a single nail, the dense board portion may include an insert at the receiving point of the front, as indicated at 95 in Figures 36 and 37. More usually, the composite portion of the inner box will include the bottom, ends and back only, set-up about suitable crushed or skived score lines and assembled with a "wood" front.

In some circumstances it may be preferable to make both front and rear sides of dense board. This is particularly desirable for boxes that have unhinged lids, as both sides of the lids may then be nailed to sides intermediate the drop lid ends, or when particularly rigid boxes are desired.

The setting up of the inner shell may be made in any suitable way, and is perhaps most conveniently made on a modified quadruple staying machine, such for example as that described in U. S. Patents 728,806 and 1,383,697. The corrugated sheets are cut to size on any suitable cutting machine, then scored along the folding lines, as by skiving or crushing. The corners are then cut out as by means of a box corner cutter on a 90° angle.

In setting up, assuming the mechanism of the quadruple staying machine described in the above patents the dense board or solid side of the box is applied to the box form 96 while the form is in its uppermost position, a suitable magazine 97 forming part of the present invention, being provided to feed the box sides 90 successively against the side of the form when the form is in its high position, (Figures 40 and 41).

The side 90 delivered to the form 96 is held to place in any way, most conveniently by suction as applied to the interior of the form at the connection 98.

The corrugated pieces 99 with the three extending wings or flaps may be fed from a stack in the usual way. A front 90 is thus placed on the front of the block 96 while a corrugated piece 99 for the bottom, ends and back, is registered as usual below the form, lying flat.

The form or block 96 descends carying with it the front 90 held to it by suction or otherwise. It meets and sets up the blank 99, the ends and back of the blank folding up over the corresponding ends and back of the form as the form travels downward between suitable guides 100.

The guides 100 hold the blank 99 in set-up position and during the downward movement the stays 64 may be applied along the four corners in the usual way for this type of machine.

When the form 96 retracts upwardly it leaves the set-up box 101 as the top box of a pile held resiliently in a guideway 102 (Figure 32) normally part of the machine.

Each newly set-up box downwardly progresses the pile the height of one box, delivering the bottom box of the pile from the guideway.

The form 96 receives another solid front 90 or back or both each time it is at its uppermost position while simultaneously therewith a second blank 99 may be placed as before below the form.

Each downward stroke of the form completes a set-up operation, delivers a set-up box into the guideway beneath the form and causes the bottom box of the pile to drop out at a point where it may be received by a suitable conveyor, the guideway holding the boxes in set-up position until sufficient time has elapsed for the adhesive on the stays applied to the box on the downward stroke of the form to set sufficiently for permanent holding.

It will be understood that the machine is normally equipped for appliances for applying the corner stays 64, suitably kraft paper, to the outside of the boxes and that the application of these stays therefore is not part of the present invention.

The tape forming the stays 64 is cut off after it has been applied to the corners of the box and the box then continues on downward through the guideway with the walls of the guide fitting the outside of the box and holding the walls in set-up position.

New features added to this machine include the mechanism for applying the front 90 to the side of the form 96 and for holding the applied fronts to place against the form during the set-up operations, as well as broadly the method of using the old mechanism which consists in applying different portions of the box to the form at different vertical positions thereof.

The inner box, when discharged from the staying machine is ready either to have a wrap applied directly to it, the finished box then having but a single shell with an outside wrap, or it is ready to have an outer shell applied to the inner shell as already described, preferably with the simultaneous application of the outside wrap.

If the inner box is to be used alone, stays may be applied to the inside corners. The inner box may be lined while still in the flat stage or optionally the board from which the inner box is made up may be lined in large sheets before the board is cut to size. In this event the front would usually have to be lined also.

It is thought preferable to postpone or delay the lining until the box has been wrapped and then to apply a cruciform shaped lining in any suitable and known manner such as described in Kleinsmith Patent No. 1,810,171, granted March 23, 1933, for Box lining machine.

It will be evident that in the assemblage of the parts, the bottoms of the inner shell and outer shell and the wrap must be registered and united first and that the inner shells may most conveniently be formed up separately before they are united to the outer shells and the latter united to the wraps.

It will further be evident that after the folding up of the ends of the outer shell the operation of wrapping in the Figure 6 form, for example, can be performed as a normal machine box wrapping operation by a wrapping machine of the character of that shown in the Kleinsmith et al. Patent No. 1,733,229 since the long sides of the outer shell may be turned up simultaneously with and because of the turning up of the long sides of the wraps.

It is also clear that, in the Figure 5 form, after the ends of the outer shell have been turned up and united with the inner shell and the extension sides of the ends have been united to the long sides of the inner shell, the operation can be completed as a normal box wrapping operation for the same reason that the long sides of the outer shell can then be wrapped up along with the long sides of the wrap. The lateral extensions of the ends of the outer shell perform a drop lid cover function in addition to their corner reinforcement function, which drop lid cover function would be performed even if the lower parts of these extensions were omitted.

Outer stays such as are shown in Figures 5 and 6 with or without inner stays, such as are shown in Figure 4b, are particularly advantageous in holding the inner shell together during the operation and permanently thereafter and because the stays can be applied by standard staying machines.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:—

1. The method of forming a composite drop lid end box comprising inner and outer shells and a wrap about the outer shell which consists in registering the blank for the outer shell upon the wrap, in registering the preformed inner shell upon the blank for the outer shell, in turning up the ends of the blank for the outer shell into glued engagement with the inner shell, in turning up the long sides of the outer shell into engagement with the inner shell, in subsequently turning up the ends of the wraps into engagement with the ends of the shell and continuing the operation as in normal wrapping.

2. In the method of forming and wrapping a box comprising inner and outer shells for drop lid boxes and a wrap about the outer shell, the novelty of which consists in forming the inner shell into a box, in extending the lateral edges of the outer shell to form drop lid end corner protections for the inner shell, in registering the inner shell with the outer shell blank and with the wrapper blank and preliminarily uniting them, in folding the outer shell ends against the inner shell ends, in folding in the drop lid end corner protections, in folding up the long sides of the wrap and the long sides of the outer shell against the long sides of the inner shell and uniting them, in folding up the ends of the wraps against the ends of the outer shell and in completing the wrapping operation as in normal wrapping.

3. The method of forming a composite box which consists in forming an inner box shell, in registering and uniting it to the bottom of an outer box shell and the latter to the bottom of a wrap, in supporting stays for the outer shell upon the wrap, in uniting the ends of the outer shell to the ends of the inner shell, in coincidently uniting the sides of the outer shell to the long sides of the inner shell and the long sides of the wrap to the long sides of the outer shell and at the same time applying the stays supported upon the long sides of the wrap and in completing the wrapping operation to fully unite the stays to the outer shell.

4. The method of forming a composite box having a long side initially separate from the rest of the box, which consists in holding the separate long side to the form about which the box is to be folded by suction, in pressing the form against the bottom of the box with the long side in place, in bending up the other long side and ends of the blank against the form and in uniting the sides and ends about the form to complete the box.

FRANK RODGERS NEELY.